United States Patent [19]

Ito et al.

[11] Patent Number: 5,721,993
[45] Date of Patent: Feb. 24, 1998

[54] DATA PROJECTION DEVICE FOR CAMERAS AND A CAMERA UTILIZING THE DEVICE

[76] Inventors: Shinsuke Ito; Haruyoshi Yamada; Hirohisa Nakano, all of 3-5 Owa 3-chome, Suwa-shi, Nagano-ken 392, c/o Seiko Epson Corporation, Japan

[21] Appl. No.: 772,049

[22] Filed: Dec. 19, 1996

Related U.S. Application Data

[63] Continuation of Ser. No. 539,472, Oct. 5, 1995, abandoned.

[30] Foreign Application Priority Data

Oct. 14, 1994 [JP] Japan .................... 6-249859

[51] Int. Cl.⁶ ............................................. G03B 17/24
[52] U.S. Cl. .............................................. 396/315
[58] Field of Search .................................. 396/310, 313, 396/314, 315, 316, 317, 318, 267, 452

[56] References Cited

U.S. PATENT DOCUMENTS

| | | | |
|---|---|---|---|
| 5,028,942 | 7/1991 | Kirigaya | 354/106 |
| 5,294,950 | 3/1994 | Du Vaull et al. | 354/109 |
| 5,319,402 | 6/1994 | Tsujimoto et al. | 354/106 |
| 5,339,125 | 8/1994 | Fridman | 354/106 |
| 5,345,283 | 9/1994 | Satoh et al. | 354/106 |
| 5,349,402 | 9/1994 | Soshi et al. | 354/106 |
| 5,469,237 | 11/1995 | Itoh et al. | 354/106 |
| 5,471,265 | 11/1995 | Shibata et al. | 354/106 |
| 5,471,268 | 11/1995 | Jeong | 354/106 |
| 5,473,397 | 12/1995 | Miyamoto et al. | 354/106 |
| 5,493,354 | 2/1996 | Watanabe et al. | 354/106 |
| 5,534,956 | 7/1996 | Iwashita et al. | 354/106 |

*Primary Examiner*—Safet Metjahic
*Assistant Examiner*—Nicholas J. Tuccilio

[57] ABSTRACT

In data projection device, a liquid crystal display panel which forms a data pattern, such as the date, as a translucent area, is positioned in the middle of an optical path located between an ambient light inlet and a photographic film. A data projection shutter which can work in conjunction with a photographic shutter, is positioned on the side of the film relative to a liquid crystal display panel. Manual projection optical path switching device is arranged in a data projection shutter and switches between the state in which the data projection shutter operates in conjunction with the photographic shutter and a state in which an interlock between the data projection shutter and the photographic shutter is released.

25 Claims, 5 Drawing Sheets

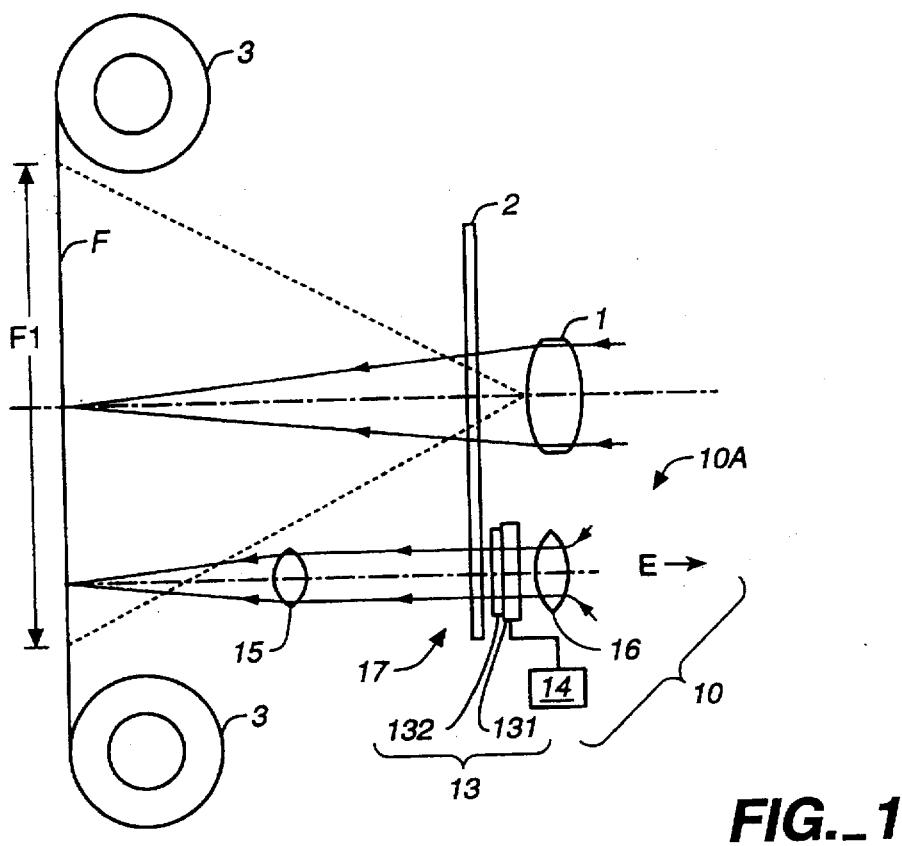
FIG._1
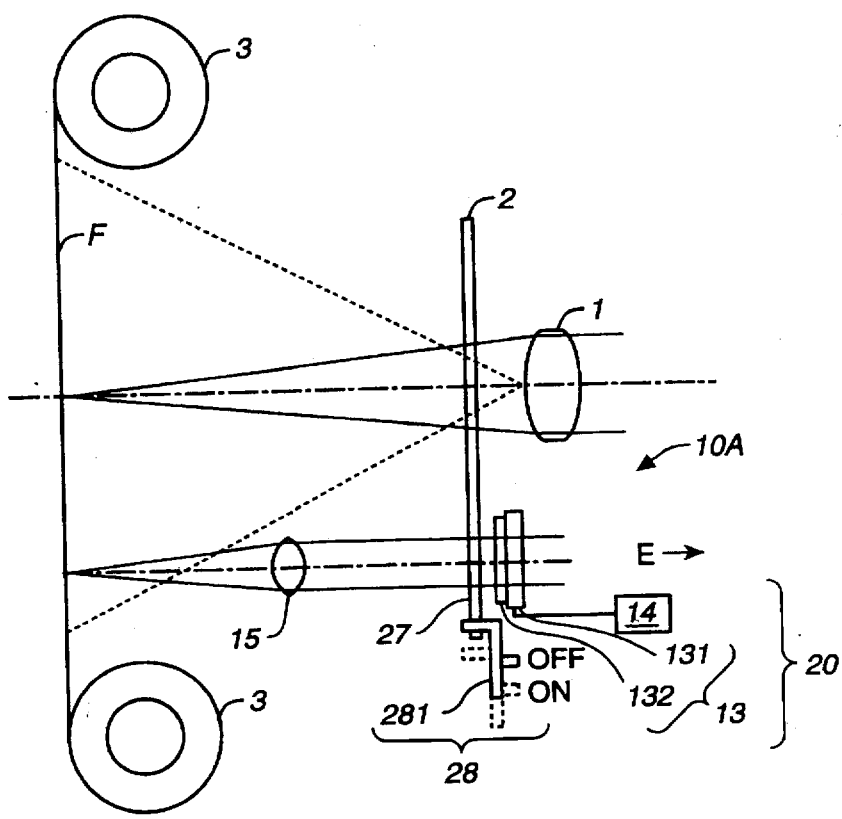
FIG._2

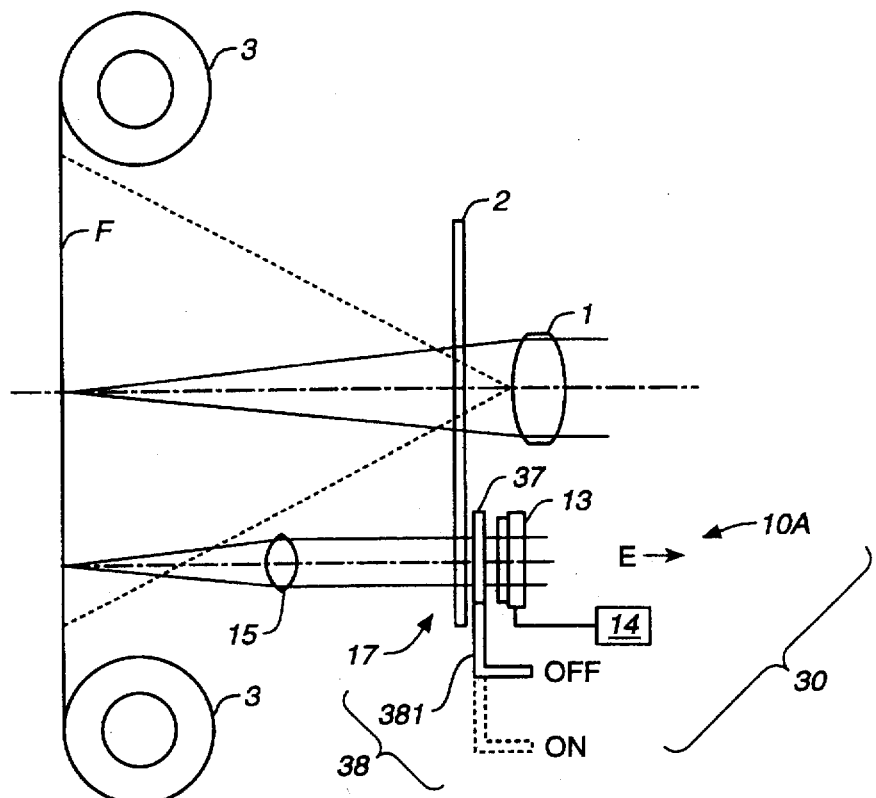
FIG._3
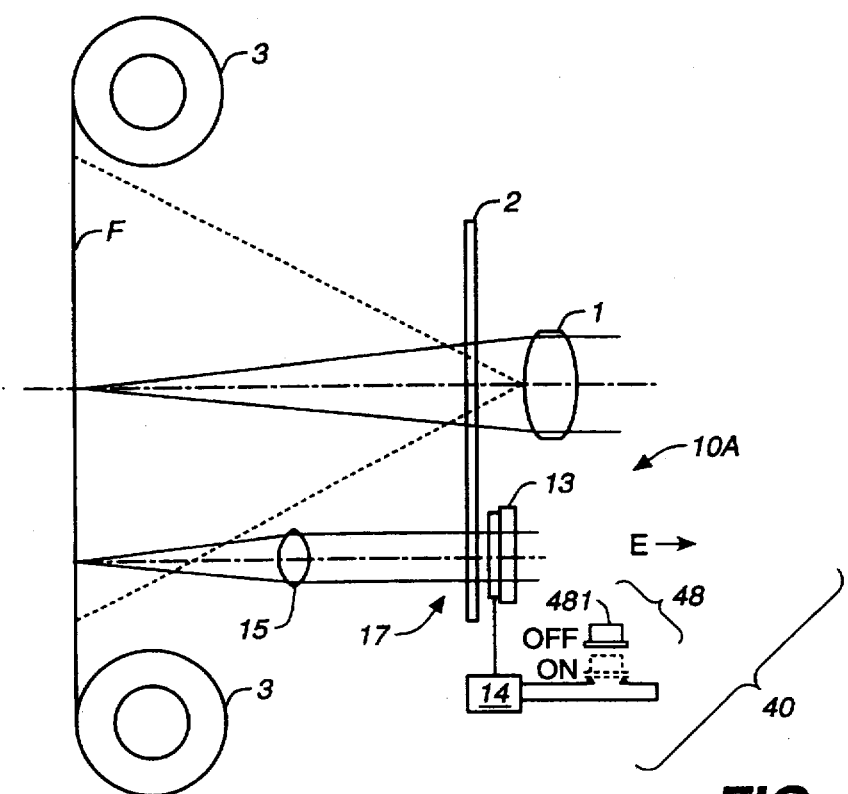
FIG._4

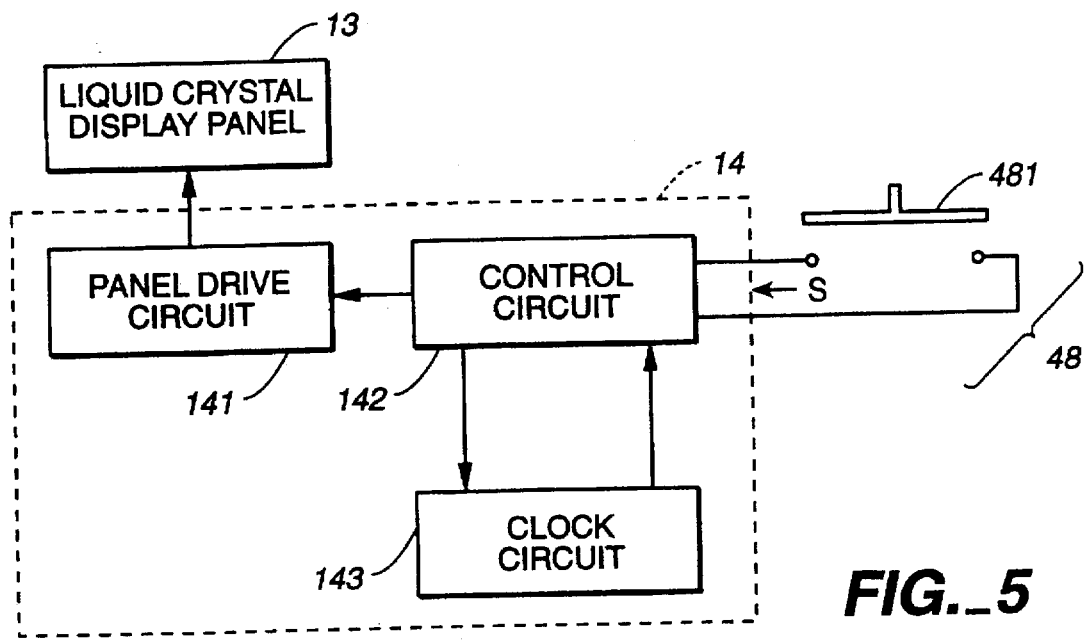
FIG._5
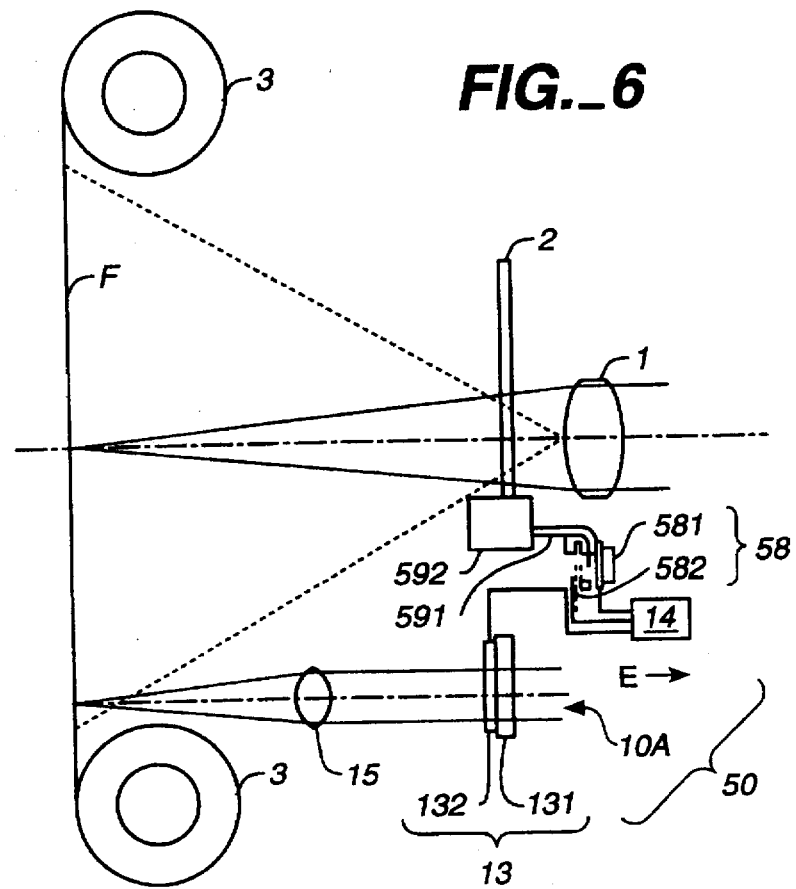
FIG._6

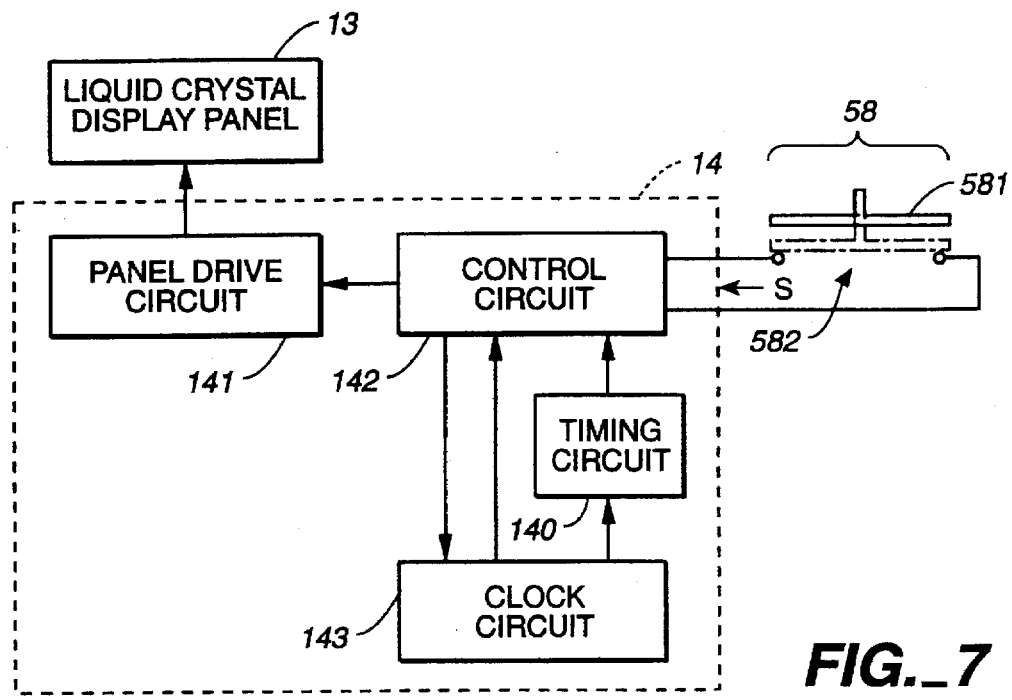
FIG._7
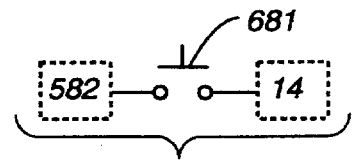
FIG._8A
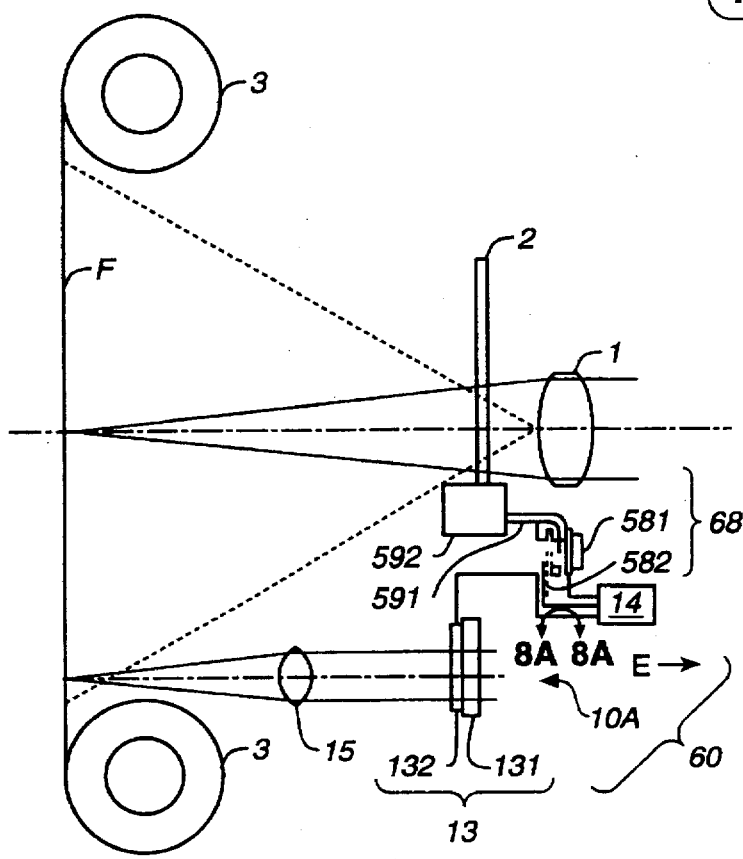
FIG._8

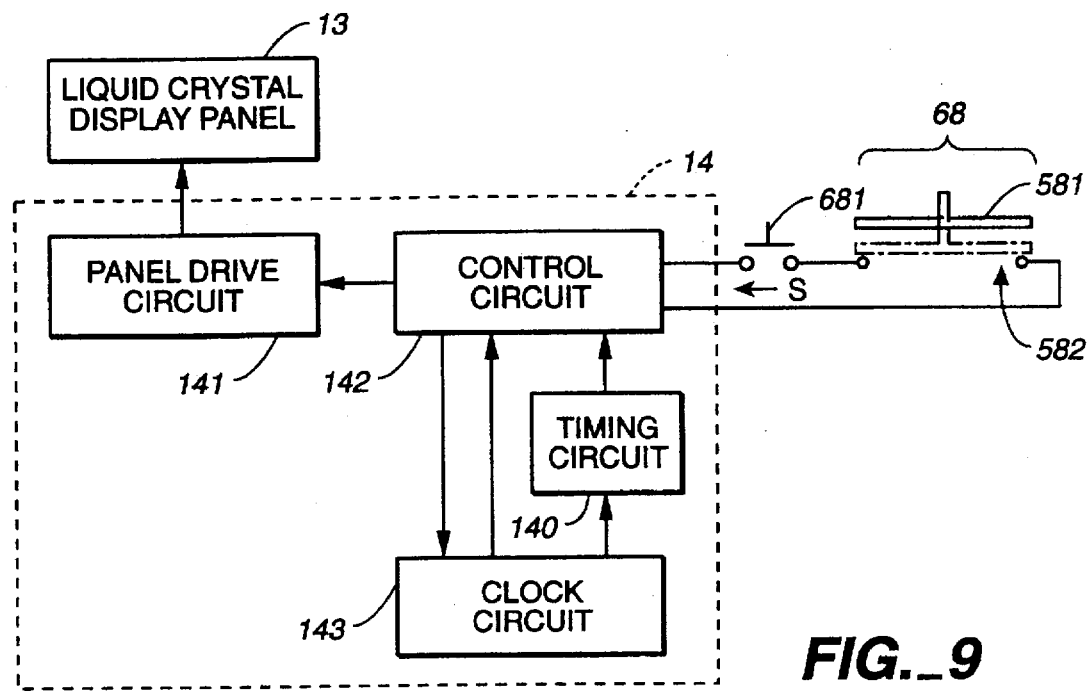
FIG._9
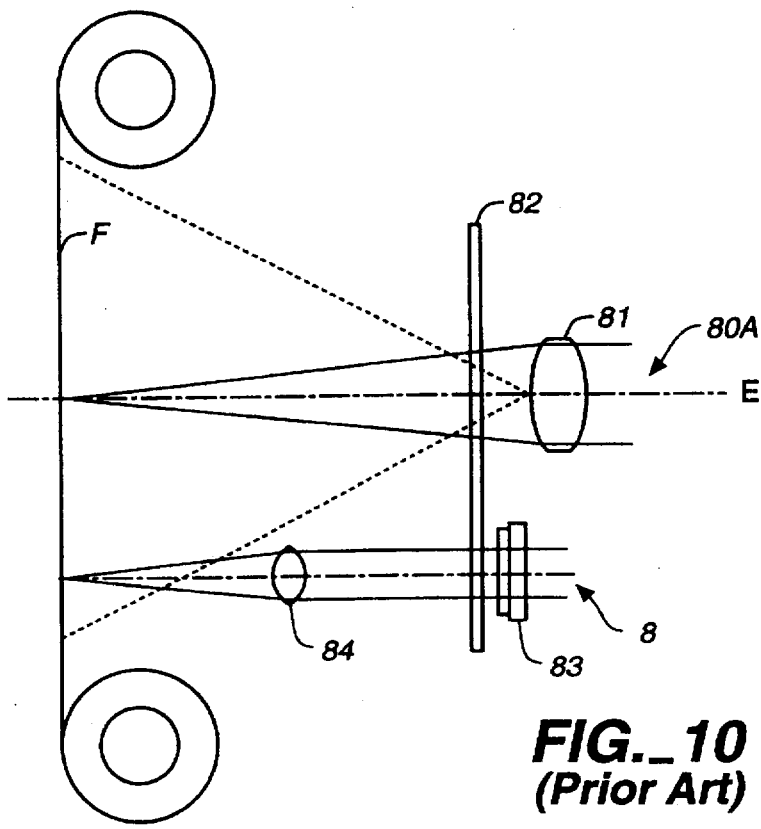
FIG._10
*(Prior Art)*

DATA PROJECTION DEVICE FOR CAMERAS AND A CAMERA UTILIZING THE DEVICE

This is a Continuation of application Ser. No. 08/539,472 filed Oct. 5, 1995 now abandoned.

BACKGROUND OF THE INVENTION

1. Field of the Invention

The present invention relates to a data projection device. In particular, the present invention can be used in cameras that projects a data pattern generated on a liquid crystal display panel onto photographic film using the ambient light. More particularly, the present invention can be utilized with a disposable camera.

2. Description of the Related Art

FIG. 10 schematically shows a conventional camera equipped with a built-in data transfer device used for projecting data, such as the time and date, onto a photographic film. In such a camera, ordinary photographic shutter 82 is positioned between camera lens 81 and photographic film F, and in addition to this optical system, transmission-type liquid crystal display panel 83, which can form the data pattern to be projected onto photographic film F as a translucent area, is positioned in the middle of optical path 80a located between ambient light entry side E and photographic film F. With this configuration, after having its excess light blocked out by liquid crystal display panel 83, the light entering ambient light entry side E projects a data image corresponding to the data pattern onto photographic film F, by exposing a corner of photographic film F via imaging lens 84. The data projection operation is controlled by photographic shutter 82, and is performed in conjunction with a normal photo-taking operation.

However, in conventional devices completely linking the data projection operation with a normal photo-taking operation, typically results in the following problems. For example, because the light transmission rate of liquid crystal display panel 83 is generally around 20%, if the same exposure time as in normal photography is used, the data image projected onto photographic film F tends to be unclear. Furthermore, since data projection operation is completely linked with a normal photo-taking operation, it is not possible to omit the data projection when taking normal photographs.

In an attempt to solve such problems, it has been proposed to install a data projection shutter that operates independently from photographic shutter 82, allowing the photo-taking operation to be performed completely independently from data projection. However, adding such a complicated mechanism for performing such an operation would increase both the size and weight of a camera. Consequently, no such data projection device for cameras has been commercialized so far.

In the case of disposable cameras, whose popularity has increased in recent years, the requirement for low cost and simple mechanism precludes the use of a conventional projecting device.

OBJECTS OF THE INVENTION

Accordingly, it is an object of the present invention to solve the aforementioned problems with conventional devices, and eliminate the problems of the data projection operation.

It is a further object of the present invention to provide both an easy-to-use data projection device for cameras and disposable cameras, without adding a complicated mechanism.

SUMMARY OF THE INVENTION

In order to solve the above-mentioned problems, in a first aspect of the present invention, a data projection device for cameras which uses ambient light taken in through an ambient light inlet to project a data image corresponding to a data pattern onto a photographic film, comprises a liquid crystal display panel positioned in a middle portion of an optical path located between the ambient light inlet and the photographic film, a panel drive circuit for generating the data pattern to be projected onto the photographic film as a translucent area, and a shutter area in which the optical path opens and closes in conjunction with the operation of a photographic shutter. A condensing element, which condenses the ambient light onto the liquid crystal display panel, is arranged on a front side of the liquid crystal display panel, i.e., on the ambient light inlet side of the liquid crystal display panel.

As a result of such a configuration, an increased amount of light is available for data projection. Therefore, it is possible to obtain an effect similar to that obtained by lengthening the exposure time, without adding a complicated mechanism, thus improving the clarity of the data image projected onto the photographic film.

In accordance with another aspect of the present invention, a projection optical path switching device is installed which selectively switches between a first state in which the data projection shutter operates in conjunction with the photographic shutter and a second state in which an interlock between the data projection shutter and the photographic shutter is released for inhibiting the operation of the data projection shutter in the optical path.

In this configuration, when data projection is required, the data projection shutter is operated in conjunction with the photographic shutter. In contrast, when data projection is not required, the shutter interlock is released. Therefore, it becomes possible to omit data projection when taking normal photographs, without the addition of a complicated mechanism for operating the two shutters completely independently.

In accordance with an additional aspect of the present invention, a data projection shutter is arranged which can open or close the optical path independently from the operation of the photographic shutter.

In this additional configuration, when data projection is required, the photographic shutter and the data projection shutter are operated synchronously, with the optical path opened by the data projection shutter. In contrast, when data projection is not required, it becomes possible to take normal photographs with the optical path closed by the data projection shutter.

In accordance with a further aspect of the present invention, a projection optical path switching device is arranged which switches between the state in which the liquid crystal display panel forms a data pattern and the state in which data pattern formation is stopped and the entire display area of the liquid crystal display panel becomes a light-shielding area.

In this further configuration, when data projection is required, the liquid crystal display panel is kept in a data pattern formation state. In contrast, when data projection is not required, it becomes possible to take normal photographs with the entire display area made into a light-shielding area by the projection optical path switching device.

In accordance with still an additional aspect of the present invention, the liquid crystal display panel forms a data pattern in conjunction with the opening of the photographic shutter, and in that, a projection optical path switching device is arranged in which the entire display surface of the liquid crystal display panel acts as a light-shielding area after a preset amount of data projection time elapses, regardless of the closing of the photographic shutter.

In this configuration, when the photographic shutter opens, a data pattern is formed on the liquid crystal display panel, and data projection begins. It will be appreciated by one of ordinary skill in the art that even when the photographic shutter closes, the entire display surface of the liquid crystal display panel will not become a light-shielding area until a preset amount of data projection time elapses. Consequently, it is possible to perform data projection for an optimum length of time, regardless of the duration in which the photographic shutter is open.

In accordance with still yet an additional aspect of the present invention, a projection optical path switching device is provided for selectively switching between a first state in which the liquid crystal display panel forms a data pattern in conjunction with the opening of the photographic shutter and a second state in which a interlock with the photographic shutter is released and the entire display surface of the liquid crystal display panel is made into a light-shielding area, even when the photographic shutter opens.

In this configuration, when data projection is required, the liquid crystal display panel forms a data pattern in conjunction with the operation of the photographic shutter. In contrast, when data projection is not required, it becomes possible to take photographs without forming a data pattern in the liquid crystal display panel while keeping the entire display area as a light-shielding area.

As a result of any of these configurations, the data projection device for cameras according to the invention is simple and inexpensive. As such, it is suited for installation not only in ordinary cameras but also in disposable cameras.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts

FIG. 1 is a top view diagram schematically showing the major components inside a camera comprising a data projection device in accordance with a first embodiment of the present invention;

FIG. 2 is a top view diagram schematically showing the major components inside a camera incorporating a data projection device in accordance with a second embodiment of the present invention;

FIG. 3 is a top view diagram schematically showing the major components inside a camera incorporating a data projection device in accordance with a third embodiment of the present invention;

FIG. 4 is a top view diagram schematically showing the major components inside a camera incorporating a data projection device in accordance with a fourth embodiment of the present invention;

FIG. 5 is a functional block diagram of the panel circuit and data projection optical path switching device in accordance with the data projection device shown in FIG. 4;

FIG. 6 is a top view diagram schematically showing the major components inside a camera incorporating a data projection device in accordance with a fifth embodiment of the present invention;

FIG. 7 is a block diagram showing the functions of a panel circuit and a data projection optical path switching device in accordance with the data projection device shown in FIG. 6;

FIG. 8 is a top view diagram schematically showing the major components inside a camera incorporating a data projection device in accordance with a sixth embodiment of the present invention;

FIG. 8A is a detailed schematic view of an interlock release mechanism of FIG. 8;

FIG. 9 is a block diagram showing the functions of a panel circuit and a data projection optical path switching device in accordance with the data projection device shown in FIG. 8; and FIG. 10 is a top view diagram schematically showing the major components inside a camera incorporating a conventional data projection device.

DESCRIPTION OF THE PREFERRED EMBODIMENTS

The following embodiments of the present invention will be explained with references to the attached figures.

First Embodiment

FIG. 1 is a top view, schematically showing the major components inside a camera, preferably a disposable camera, with film, in which a data projection device in accordance with the first embodiment of the present invention has been incorporated.

As shown in FIG. 1, photographic shutter 2 is installed between camera lens 1 and photographic film F. This photographic shutter 2 controls the operation of projecting images onto photographic film F. The camera further comprises film feeding mechanism 3 for position photographic film F. As will be understood, the camera configuration is conventional and its details are omitted.

In data projection device 10, shown in FIG. 1, transmission-type liquid crystal display panel 13 is positioned in a middle portion of optical path 10a, located between ambient light inlet E and photographic film F. The liquid crystal display panel 13 comprises liquid crystal cells that are formed by sealing liquid crystals between a pair of electrode substrates 131 and 132. Liquid crystal display panel 13 is driven by panel circuit 14, and data patterns such as date and time can be displayed as translucent areas by changing the orientation of the liquid crystals in each display segment. Photographic shutter 2 is extended to the back side of liquid crystal display panel 13, i.e., onto the part of optical path 10a that is located between liquid crystal display panel 13 and photographic film F, forming shutter area 17. In this way, data projection device 10 projects data in conjunction with normal photo-taking operations. Note that, in shutter area 17, instead of extending photographic shutter 2, it is possible to install a separate data projection shutter which works in conjunction with photographic shutter 2. Focusing lens 15 is positioned in optical path 10a which is located between liquid crystal display panel 13 and photographic film F, and which focuses the light coming through liquid crystal display panel 13 onto photographic film F.

In data projection device 10 configured in this fashion, after having its excess light eliminated based on the data pattern formed as a translucent area in liquid crystal display panel 13, the ambient light taken in through ambient light inlet E forms a data image on photographic film F via focusing lens 15. In photographic film F, the area indicated by arrow F1 is the area in which regular photographic images are projected, and a data image, such as the date, is projected in its corner. In such a data projection operation, the exposure time for data projection is the same as that for normal photography because the aperture time is controlled by photographic shutter 2. Since the light transmission rate of liquid crystal display panel 13 is as low as 20%, the exposure time may be insufficient for data projection device 10.

Therefore, in the preferred embodiment, the potential problem of insufficient exposure time is solved in the following manner. Condensing element 16, which condenses the ambient light onto liquid crystal display panel 13, is arranged on the front side of liquid crystal display panel 13, i.e., on ambient light inlet side E of liquid crystal display panel 13. Although condensing element 16 is installed immediately in front of liquid crystal display panel 13 in this working example, it can be positioned anywhere as long as it can condense the ambient light.

In data projection device 10 configured in this way, the light available for data projection increases since the ambient light condensed by condensing element 16 reaches liquid crystal display panel 13. Therefore, the problem of insufficient exposure can be solved by simply adding condensing element 16, without any modifications to the basic structure in which the data projection operation is performed in conjunction with the operation of photographic shutter 2.

Second Embodiment

FIG. 2 is a top view, schematically showing the major components inside a camera incorporating the data projection device in accordance with the second embodiment of the present invention. In the configuration of the camera in this working example, the camera lens, the photographic shutter, the photographic film feeding mechanism, the liquid crystal display panel, etc. are similar to those in the first embodiment. Therefore, the same reference numeral symbols are used for the components, and their explanations are omitted.

In data projection device 20 of the second embodiment, liquid crystal display panel 13 is positioned in the middle of optical path 10a located between ambient light inlet E and photographic film F. The liquid crystal display panel 13 comprises liquid crystal cells that are formed by sealing liquid crystals between a pair of electrode substrates 131 and 132. Liquid crystal display panel 13 is controlled by panel circuit 14 and can form data patterns such as the date as translucent areas. As shown therein, focusing lens 15 is positioned in optical path 10a which is located between liquid crystal display panel 13 and photographic film F.

In this embodiment, data projection shutter 27, which is separate from but capable of operation in conjunction with photographic shutter 2, is positioned in a portion of optical path 10a that is located on the side of film F, relative to liquid crystal display panel 13. Manual projection optical path switching device 28 is arranged in data projection shutter 27, and selectively switches between a first state in which data projection shutter 27 operates in conjunction with photographic shutter 2 and a second state in which an interlock between data projection shutter 27 and photographic shutter 2 is released, stopping data projection shutter 27 in optical path 10a. When ON/OFF lever 281 of the projection optical path switching device 28 is moved from the side of optical path 10a into the OFF position indicated by the solid line in FIG. 2, ON/OFF lever 281 engages with the end of data projection shutter 27, keeping data projection shutter 27 in the position that blocks optical path 10a, even when photographic shutter 2 is activated. In contrast, when ON/OFF lever 281 is moved from the side of optical path 10a out to the ON position, indicated by the dotted line, ON/OFF lever 281 becomes disengaged from data projection shutter 27. As a result, data projection shutter 27 removed from optical path 10a synchronously with the activation of photographic shutter 2.

In data projection device 20 configured in this way, for normal photography and data projection, ON/OFF lever 281 is moved from the side of optical path 10a and is left in an ON position indicated by the dotted line. From this state, when the shutter button (not shown in the figure) is depressed, photographic shutter 2 is activated and a normal photograph is taken. Simultaneously, data projection shutter 27 opens optical path 10a in conjunction with the operation of photographic shutter 2, and thus the ambient light passing through liquid crystal display panel 13 projects onto photographic film F. As a result, a data image corresponding to the data pattern generated by liquid crystal display panel 13. In contrast, for taking a normal photograph without data projection, ON/OFF lever 281 is pressed from the side of optical path 10a into the OFF position indicated by the dotted line. In this state, data is not projected onto photographic film F even when photographic shutter 2 is activated, since data projection shutter 27 remains blocking optical path 10a.

As explained above, in data projection device 20 of the second embodiment, data projection shutter 27 is operated in conjunction with the operation of photographic shutter 2 when data projection is to be performed, and the interlock is released when no data projection is required. Therefore, data projection can be performed without the installation of a drive mechanism dedicated to the data projection shutter, and furthermore it is possible to omit data projection when taking normal photographs.

Third Embodiment

FIG. 3 is a top view, schematically showing the major components inside a camera comprising a data projection device in accordance with the third embodiment.

In data projection device 30 of the third embodiment, liquid crystal display panel 13 is positioned in a middle portion of optical path 10a located between ambient light inlet E and photographic film F. The liquid crystal display panel 13 is controlled by panel circuit 14 and can form data patterns such as the date as translucent areas.

Photographic shutter 2 is extended onto a portion of optical path 10a that is located between liquid crystal display panel 13 and photographic film F, forming shutter area 17. In this way, data projection device 30 can project data in conjunction with normal photographic operations. Note that, in shutter area 17, instead of extending photographic shutter 2, it is possible to install a separate shutter that operates in conjunction with photographic shutter 2.

In this embodiment, data projection shutter 37, which is separate from photographic shutter 2, is arranged between liquid crystal display panel 13 and photographic shutter 2. Furthermore, manual projection optical path switching device 38 is positioned in data projection shutter 37, and selectively switches between a first state in which data projection shutter 37 blocks optical path 10a and a second state in which data projection shutter 37 is retracted from optical path 10a.

When ON/OFF lever 381 of the projection optical path switching device 38 is moved toward the side of optical path 10a into an OFF position, indicated by the solid line in FIG. 3, data projection shutter 37 blocks optical path 10a.

Consequently, even when photographic shutter 2 is activated and is removed from optical path 10a, data projection shutter 27 still blocks optical path 10a. Therefore, while normal photographs can be taken, and data patterns, such as the date, formed on liquid crystal display panel 13 will not be projected onto photographic film F.

In contrast, if ON/OFF lever 381 is positioned on the side of optical path 10a to an ON position indicated by the dotted line in FIG. 3, when photographic shutter 2 is activated and is removed from optical path 10a, a normal photograph is taken and a data pattern, such as a date formed on liquid crystal display panel 13, is projected onto photographic film F.

As explained above, in data projection device 30 of the third embodiment, the operation of photographic shutter 2 is utilized when data projection is to be performed. If no data projection is to be performed, data projection shutter 37 is used to block optical path 10a even when photographic shutter 2 opens optical path 10a. Therefore, data projection can be performed without the installation of a drive mechanisms dedicated to the data projection shutter, and furthermore it is possible to omit data projection when taking normal photographs.

Fourth Embodiment

FIG. 4 is a top view, schematically showing the major components inside a camera comprising a data projection device in accordance with a fourth embodiment of the present invention. FIG. 5 is a block diagram of the panel drive circuit employed by the embodiment. While FIG. 5 illustrates a preferred diagram, those skilled in the art who have read this description will recognize that other circuit designs are possible.

In data projection device 40 of this embodiment shown in FIG. 4, liquid crystal display panel 13 is positioned in a middle position of optical path 10a located between ambient light inlet E and photographic film F. The liquid crystal display panel 13 is controlled by panel drive circuit 14, preferably implemented as an integrated circuit, and can form data patterns, such as the date, as translucent areas.

Photographic shutter 2 is extended onto the part of optical path 10a that is located between liquid crystal display panel 13 and photographic film F, forming shutter area 17. In this way, data projection device 10 can project data in conjunction with normal photo-taking operations. Note that, in shutter area 17, instead of extending photographic shutter 2, it is possible to install a separate shutter that works in conjunction with photographic shutter 2.

In this fourth embodiment, projection optical path switching device 48 is provided, which selectively switches between a first state in which liquid crystal display panel 13 forms a data pattern independently from the operation of photographic shutter 2 and a second state in which said data pattern formation is inhibited and the entire display area of liquid crystal display panel 13 is set as a light-shielding area. That is, switch 481 for inhibiting panel display is provided in panel drive circuit 14, as shown in FIG. 5.

In the projection optical path switching device 48, when switch 481 is closed, signal S indicating is provided as input to panel circuit 14. Panel circuit 14 comprises drive circuit 141, control circuit 142, and clock circuit 143. In the first state, control circuit 142 displays the date data driven by panel drive circuit 141 in accordance with clock circuit 143, as a data pattern in liquid crystal display panel 13. In contrast, in the second state switch 481 is open, control circuit 142 does not display a data pattern in liquid crystal display panel 13.

In data projection device 40 configured as described above, when switch 481 of projection optical path switching device 48 is set to the ON position, indicated by the solid line in FIG. 4, and is closed, liquid crystal display panel 13 forms a data pattern based on a data signal from panel drive area 14. Therefore, when photographic shutter 2 is activated and does not block optical path 10a, the data pattern formed by liquid crystal display panel 13 is projected as a data image onto photographic film F.

In contrast, when switch 481 of projection optical path switching device 48 is set the OFF position indicated by the solid line in FIG. 4, and is opened, panel drive circuit 14 provides no data signal into liquid crystal display panel 13. Consequently, the entire display area of display panel 13 remains as a light-shielding area. In this state, even when photographic shutter 2 is activated and does not block optical path 10a, no data image is projected onto photographic film F since liquid crystal display panel 13 acts as a shutter and blocks optical path 10a.

In accordance with the fourth embodiment, the operation of photographic shutter 2 is utilized when data projection is to be performed. When no data projection is to be performed, liquid crystal display panel 13 itself blocks optical path 10a even if photographic shutter 2 releases optical path 10a. Therefore, it is possible to omit data projection when taking normal photographs.

Fifth Embodiment

FIG. 6 is a top view, schematically showing the major components inside a camera comprising a data projection device in accordance with the fifth embodiment of the present invention installed. FIG. 7 is a preferred block diagram of the panel circuit.

In data projection device 50 (data projection device for cameras) of the fifth embodiment, liquid crystal display panel 13 is positioned in a middle position of optical path 10a located between ambient light inlet E and photographic film F. The liquid crystal display panel 13 is controlled by panel circuit 14 (preferably implemented as an integrated circuit) and can form data patterns such as the date as translucent areas.

In this embodiment, photographic shutter 2 is not extended onto the side of data projection device 50 (optical path 10a), nor has a separate shutter been provided. However, in this fifth embodiment, optical path 10a can be blocked by operating liquid crystal display panel 13 as a shutter by arranging the entire display surface of liquid crystal display panel 13 as a light-shielding area.

Furthermore, in this embodiment, data projection is initiated when liquid crystal display panel 13 forms a data pattern in conjunction with the opening action of photographic shutter 2. Also, projection optical path switching device 58 is provided, which makes the entire display surface of liquid crystal display panel 13 a light-shielding area after a preset data projection time elapses, even if photographic shutter 2 closes. That is, panel display ON/OFF switch 582, which opens and closes in conjunction with release switch 581 for photography purposes, is positioned in projection optical path switching device 58.

In projection optical path switching device 58, when release switch 581 for taking a picture is depressed, its motion is relayed to shutter drive device 592 via shutter joint lever 591. As a result, shutter drive device 592 opens photographic shutter 2 for photograph taking, and a normal photograph is taken. On the other hand, when switch 582 is closed, as indicated by the dotted line in FIG. 6, in conjunction with the opening (depressing of release switch 58) of photographic shutter 2, signal S indicating this state is provided to panel drive circuit 14. Panel circuit 14 comprises drive circuit 141, control circuit 142, and clock circuit 143, as shown in FIG. 7. Therefore, control circuit 142 activates drive circuit 141 and displays a data pattern, such as the date, in accordance with clock circuit 143, in liquid crystal display panel 13. As a result, projection onto photographic film F of a data image corresponding to a data pattern begins.

Next, while shutter drive device 592 closes photographic shutter 2, release switch 581 returns, completing the taking of a normal photograph.

However, in this embodiment, images of data, such as the date, continue even if photographic shutter 2 closes. That is, panel drive circuit 14 includes timing circuit 140 in which data projection is set in advance. Timing circuit 140 uses clock circuit 143 to monitor whether or not a preset data projection time has elapsed. Therefore, even if photographic shutter 2 closes after control circuit 142 begins data projection, projection optical path switching device 58 will continue displaying a data pattern in liquid crystal display panel 13 until the data projection time preset in timing circuit 140 expires. Consequently, data projection will continue during that period. Subsequently, when timing circuit 140 outputs to control circuit 142, a signal indicating that the data projection time has expired, control circuit 142 stops data pattern formation in liquid crystal display panel 13, making its entire display surface a light-shielding area. As a result, projection of data image, such as the date, is terminated. This arrangement results in proper exposure of the data onto film F.

As explained above, with data projection device 50 of the fifth embodiment, normal photography taking and projection of data, such as the date, can be performed with independent exposure times. Therefore, even if the amount of available light is insufficient for projecting data onto photographic film F via liquid crystal display panel 13, this problem can be solved by extending the exposure time for data projection. Furthermore, since liquid crystal display panel 13 is energized on only during data projection in conjunction with the operation of photographic shutter 2, its power consumption can be minimized.

The data projection device can be configured such that the data projection time is preset or such that it is externally set to an arbitrarily chosen value. In the latter configuration, if data projection is set to 0 seconds, no data projection is performed. In other words, data projection can be omitted when taking a normal photograph.

Sixth Embodiment

FIG. 8 is a top view, schematically showing the major components inside a camera comprising data projection device in accordance with the sixth embodiment of the present invention. FIG. 8A is a detail overview of the interlock release circuit. FIG. 9 is a block diagram of the panel drive circuit, preferably implemented as an integrated circuit, used in the camera. In this embodiment the interlock between the liquid crystal display panel and the photographic shutter of the data projection device of the fifth embodiment can be released. Since the rest of the configuration is the same as that in the fifth embodiment, the same symbols are used for the same elements, and their explanations are omitted.

In data projection device 60 (data projection device for cameras) of this embodiment, photographic shutter 2 is not extended onto the side of optical path 10a, nor has a separate shutter been installed. However, optical path 10a can be blocked by making liquid crystal display panel 13 function as a shutter by making the entire display surface of liquid crystal display panel 13 a light-shielding area.

In this embodiment, projection optical path switching device 68 is provided, which selectively switches between a first state in which a data pattern is formed in conjunction with the opening of photographic shutter 2 and a second state in which the interlock with photographic shutter 2 is released and the entire display surface of liquid crystal display panel 13 is kept as a light-shielding area even when photographic shutter 2 opens. That is, in addition to ON/OFF switch 582 which opens and closes in conjunction with release switch 581 for photograph taking, in projection optical path switching device 58, switch 681 is inserted between panel display ON/OFF switch 582 and drive circuit 14, which is used for releasing the interlock with photographic shutter 2, as shown in FIGS. 8A and 9.

In projection optical path switching device 58, when release switch 581 is depressed while switch 681 is closed, switch 582 becomes closed as indicated by the dotted line in FIG. 8, and liquid crystal display panel 13 forms a data pattern as in the fifth embodiment. As a result, projection of a data image corresponding to a data pattern onto photographic film F begins. However, even when normal photograph taking is finished and release switch 581 returns, panel circuit 14 continues to energize liquid crystal display panel 13 to form a data pattern until the time set in timing circuit 140 elapses, and, therefore, continues data projection. After the specified data projection time has elapsed, liquid crystal display panel 13 ends the projection of a data image such as the date by making its entire display surface a light-shielding area.

In contrast, when switch 681 is open, signal S indicating that release switch 581 was depressed is not input in panel circuit 14, even when photographic shutter 2 opens, and thus panel circuit 14 does not energize liquid crystal display panel 13 to form a data pattern. Consequently, liquid crystal display panel 13 acts as a shutter and blocks optical path 10a. Thus, no data image is projected onto photographic film F, since the entire display surface of liquid crystal display panel 13 remains a light-shielding area.

As explained above, with data projection device 60 of this working example, normal photography taking and projection of data such as the date can be performed with independent exposure times. Alternatively, by leaving switch 681 open, it is possible to omit data projection when taking normal photographs. Furthermore, since liquid crystal display panel 13 is energized only during data projection in conjunction with the operation of photographic shutter 2, its power consumption can be minimized.

As explained above, the data projection device used in cameras related to the first embodiment of the invention, is characterized in that the amount of light available for data projection is increased by installing a condensing element which condenses the ambient light onto the liquid crystal display panel. Therefore, it becomes possible to increase the degree of exposure for data projection without the installation of an independent shutter mechanism for extending data projection time, and the clarity of the data image projected onto the photographic film can be enhanced.

The data projection device used in cameras related to the second embodiment of the invention is characterized in that a projection optical path switching device, which switches between a first state in which the data projection shutter operates in conjunction with the photographic shutter and a second state in which the interlock between the data projection shutter and the photographic shutter is released, makes it possible to perform data projection in conjunction with the photographic shutter, or alternatively to take photographs with the data projection shutter blocking the optical path. Therefore, it becomes possible to omit data projection when taking normal photographs, without the addition of a complicated mechanism for operating the two shutters completely independently.

The data projection device used in cameras related to the third embodiment of the invention in that a data projection shutter, which can open or close the optical path independently from the operation of the photographic shutter, makes it possible to perform data projection in conjunction with the photographic shutter, or alternatively to take photographs with the data projection shutter blocking the optical path. Therefore, it becomes possible to omit data projection when taking normal photographs, without the addition of a complicated mechanism for operating the two shutters completely independently.

The data projection device used in cameras related to the fourth embodiment of the invention in that a projection optical path switching device, which switches between a first state in which the liquid crystal display panel forms a data pattern and the state in which data pattern formation is inhibited and the entire display area of the liquid crystal display panel becomes a light-shielding area, making it possible to take photographs with the entire display surface of the liquid crystal display panel kept as a light-shielding area. Since the liquid crystal display panel itself acts as a data projection shutter, it becomes possible to omit data projection when taking normal photographs, without the addition of a complicated mechanism.

The data projection device used in cameras related to the fifth embodiment of the invention is characterized in that the liquid crystal display panel forms a data pattern in conjunction with the opening of the photographic shutter, and in that a projection optical path switching device is installed which makes the entire display surface of the liquid crystal display panel into a light-shielding area after a preset amount of data projection time has elapsed, regardless of the closing of the photographic shutter. Since data projection can be performed for an optimal duration regardless of the time during which the photographic shutter remains open, data projection exposure time can be extended. Furthermore, since the liquid crystal display panel goes on only during data projection, its power consumption can be minimized.

The data projection device used in cameras related to the sixth embodiment of the invention is characterized in that a projection optical path switching device is installed which switches between a first state in which the liquid crystal display panel forms a data pattern in conjunction with the opening of the photographic shutter and a second state in which the interlock with the photographic shutter is released. Therefore, it becomes possible to omit data projection when taking normal photographs, and furthermore, since the liquid crystal display panel goes on only during data projection, to minimize its power consumption.

While the preferred embodiment described above is utilized in a camera, as will be appreciated by those of ordinary skill in the art, the subject invention could also be used in other types of image recording devices, such as xerographic copies and video recorders. Moreover, while the data projection device preferably employs a liquid crystal panel, other types of display panels may appropriately be used.

Moreover, while the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

KEY

1 . . . camera lens
2 . . . Photographic shutter
3 . . . Feeding mechanism
10, 20, 30, 40, 50, 60. . . Data projection device for cameras
10a . . . Optical path
13 . . . Liquid crystal display panel
14 . . . Panel drive circuit
15 . . . Focusing lens
16 . . . Condensing element
27 . . . Data projection shutter
28, 38, 48, 58, 68 . . . Data projection optical path switching device
37 . . . Data projection shutter
140 . . . Timing circuit
141 . . . Panel circuit
142 . . . Control circuit
143 . . . Clock circuit
281, 381 . . . ON/OFF lever
481 . . . Panel display stop switch
581 . . . Release switch for photograph taking
582 . . . Panel display ON/OFF switch
681 . . . Interlock release switch
F. . . Photographic film
E . . . Ambient light inlet

What is claimed is:

1. A data projection device for a recording device comprising a single shutter, an ambient light inlet, and a recording medium, the single shutter being arranged between the recording medium and the ambient light inlet and between said data projection device and the recording medium, and an optical path being defined between the ambient light inlet and the single shutter, said data projection device comprising:

a display panel positioned in a middle portion of the optical path;

a panel drive circuit for providing to said display panel a data pattern to be projected onto the recording medium as a translucent area, in accordance with ambient light from a source passing from the ambient light inlet through the shutter; and a condensing element arranged in the path of said display panel, the single shutter and the ambient light inlet for increasing an amount of the ambient light from the source passing through said display panel onto the recording medium, wherein when the single shutter is operated the ambient light
(1) impinges the recording medium for recording, and
(2) passes through said condensing means and said display panel for recording the data pattern on the recording medium.

2. The data projection device according to claim 1, wherein the display panel comprises a liquid crystal display panel.

3. The data projection device according to claim 1, wherein the recording device comprises a camera.

4. The data projection device according to claim 3, wherein the recording medium comprises photographic film.

5. A data projection device for a recording device comprising a first shutter, an ambient light inlet, a recording medium, the first shutter being arranged between the recording medium and the ambient light inlet, and an optical path being defined between the ambient light inlet and the first shutter, said data projection device comprising:

a display panel positioned in a middle portion of the optical path;

a panel drive circuit for providing to said display panel a data pattern to be projected onto the recording medium as a translucent area, in accordance with ambient light passing from the ambient light inlet through the shutter;

a second shutter arranged between said display panel and the ambient light inlet;

an interlock operatively connected between said second shutter and the first shutter; and a projection optical path switching device arranged between said display panel and the ambient light inlet for switching between (1) a first state in which said second shutter operates in conjunction with the first shutter, and (2) a second state in which said interlock between said second shutter and the first shutter is released, wherein in said second state operation of said second shutter is inhibited.

6. The data projection device according to claim 5, wherein the display panel comprises a liquid crystal display panel.

7. The data projection device according to claim 5, wherein the recording device comprises a camera.

8. The data projection device according to claim 7, wherein the recording medium comprises photographic film.

9. A data projection device for a recording device comprising a first shutter, an ambient light inlet, a recording medium, the first shutter being arranged between the recording medium and the ambient light inlet, and an optical path being defined between the ambient light inlet and the first shutter, said data projection device comprising:

a display panel positioned in a middle portion of the optical path;

a panel drive circuit for providing to said display panel a data pattern to be projected onto the recording medium as a translucent area, in accordance with ambient light passing from the ambient light inlet through the shutter; and a second shutter arranged between said display panel and the ambient light inlet, wherein said second shutter operates independently from an operation of the first shutter, wherein the first shutter is arranged between said second shutter and the recording medium.

10. The data projection device according to claim 9, wherein the display panel comprises a liquid crystal display panel.

11. The data projection device according to claim 9, wherein the recording device comprises a camera.

12. The data projection device according to claim 11, wherein the recording medium comprises photographic film.

13. A data projection device for a recording device comprising a first shutter, an ambient light inlet, a recording medium, the first shutter being arranged between the recording medium and the ambient light inlet, and an optical path being defined between the ambient light inlet and the first shutter, said data projection device comprising:

a display panel positioned in a middle portion of the optical path;

a panel drive circuit for providing to said display panel a data pattern to be projected onto the recording medium as a translucent area, in accordance with ambient light passing from the ambient light inlet through the shutter; and a projection optical path switch for controlling said panel drive circuit to a state in which said panel drive circuit is inhibited from providing the data pattern to said display after a predetermined time has elapsed and independent of a closing operation of the shutter, wherein when said panel drive circuit is inhibited a display area of said display panel becomes a light-shielding area.

14. The data projection device according to claim 13, wherein the display panel comprises a liquid crystal display panel.

15. The data projection device according to claim 13, wherein the recording device comprises a camera.

16. The data projection device according to claim 15, wherein the recording medium comprises photographic film.

17. A data projection device for a recording device comprising a first shutter, an ambient light inlet, a recording medium, the first shutter being arranged between the recording medium and the ambient light inlet, and an optical path being defined between the ambient light inlet and the first shutter, said data projection device comprising:

a display panel positioned in a middle portion of the optical path;

a panel drive circuit for providing to said display panel a data pattern to be projected onto the recording medium as a translucent area, in accordance with ambient light passing from the ambient light inlet through the shutter;

a second shutter arranged between said display panel and the ambient light inlet;

an interlock operatively connected between said second shutter and a first shutter; and a projection optical path switching device arranged between said display panel and the ambient light inlet for switching between (1) a first state in which said second shutter operates in conjunction with an opening of the first shutter, and (2) a second state in which said interlock between said second shutter and the first shutter is released, wherein in said second state operation of said second shutter is inhibited.

18. The data projection device according to claim 17, wherein the display panel comprises a liquid crystal display panel.

19. The data projection device according to claim 17, wherein the recording device comprises a camera.

20. The data projection device according to claim 19, wherein the recording medium comprises photographic film.

21. A camera comprising:

a single shutter;

an ambient light inlet;

a recording medium, and an optical path being defined between the ambient light inlet and said single shutter; and a data projection device comprising:

a display panel positioned in a middle portion of the optical path;

a panel drive circuit for providing to said display panel a data pattern to be projected onto the recording medium as a translucent area, in accordance with ambient light from a source passing from the ambient light inlet through said single shutter; and a condensing element arranged in the path of said display panel, said single shutter and the ambient light inlet for increasing an amount of the ambient light from the source passing through said display panel onto the recording medium, wherein said single shutter is arranged between the recording medium and said ambient light inlet and between said data projection device and the recording medium, wherein when said single shutter is operated ambient light passing through the ambient light inlet
(1) impinges the recording medium for recording, and
(2) passes through said condensing means and said display panel for recording the data pattern on the recording medium.

22. A camera comprising:

a first shutter;

an ambient light inlet;

a recording medium, the first shutter being arranged between the recording medium and the ambient light inlet, and an optical path being defined between the ambient light inlet and the first shutter; and a data projection device comprising:
- a display panel positioned in a middle portion of the optical path;
- a panel drive circuit for providing to said display panel a data pattern to be projected onto the recording medium as a translucent area, in accordance with ambient light passing from the ambient light inlet through the shutter;
- a second shutter arranged between said display panel and the ambient light inlet;
- an interlock operatively connected between said second shutter and the first shutter; and
- a projection optical path switching device arranged between said display panel and the ambient light inlet for switching between
  (1) a first state in which said second shutter operates in conjunction with the first shutter, and
  (2) a second state in which said interlock between said second shutter and the first shutter is released, wherein in said second state operation of said second shutter is inhibited.

23. A camera comprising:

a first shutter;

an ambient light inlet;

a recording medium, the first shutter being arranged between the recording medium and the ambient light inlet, and an optical path being defined between the ambient light inlet and the first shutter; and a data projection device comprising:

a display panel positioned in a middle portion of the optical path;

a panel drive circuit for providing to said display panel a data pattern to be projected onto the recording medium as a translucent area, in accordance with ambient light passing from the ambient light inlet through the shutter; and a second shutter arranged between said display panel and the ambient light inlet, wherein said second shutter operates independently from an operation of the first shutter, wherein the first shutter is arranged between said second shutter and the recording medium.

24. A camera comprising:

a shutter;

an ambient light inlet;

a recording medium, said shutter being arranged between the recording medium and the ambient light inlet, and an optical path being defined between the ambient light inlet and said shutter; and a data projection device comprising:
- a display panel positioned in a middle portion of the optical path;
- a panel drive circuit for providing to said display panel a data pattern to be projected onto the recording medium as a translucent area, in accordance with ambient light passing from the ambient light inlet through the shutter; and
- a projection optical path switch for controlling said panel drive circuit to a state in which said panel drive circuit is inhibited from providing the data pattern to said display after a predetermined time has elapsed and independent of a closing operation of the shutter, wherein when said panel drive circuit is inhibited a display area of said display panel becomes a light-shielding area.

25. A camera comprising:

a first shutter;

an ambient light inlet;

a recording medium, said first shutter being arranged between the recording medium and the ambient light inlet, and an optical path being defined between the ambient light inlet and said first shutter; and a data projection device comprising:
- a display panel positioned in a middle portion of the optical path;
- a panel drive circuit for providing to said display panel a data pattern to be projected onto the recording medium as a translucent area, in accordance with ambient light passing from the ambient light inlet through the shutter,
- a second shutter arranged between said display panel and the ambient light inlet;
- an interlock operatively connected between said second shutter and the first shutter; and
- a projection optical path switching device arranged between said display panel and said ambient light inlet for switching between
  (1) a first state in which said second shutter operates in conjunction with an opening of said first shutter, and
  (2) a second state in which said interlock between said second shutter and said first shutter is released, wherein in said second state operation of said second shutter is inhibited.

* * * * *

UNITED STATES PATENT AND TRADEMARK OFFICE
CERTIFICATE OF CORRECTION

PATENT NO. : 5,721,993
DATED : February 24, 1998
INVENTOR(S) : Shinsuke Ito, et al It is certified that error appears in the above-identified patent and that said Letters Patent is hereby corrected as shown below:

On the title page: Item [73] Assignee: should read --
Seiko Epson Corporation, Tokyo, Japan --.

Signed and Sealed this

Seventeenth Day of August, 1999

Q. TODD DICKINSON

Attest:

Attesting Officer

Acting Commissioner of Patents and Trademarks